April 8, 1969  M. A. JORDAN ET AL  3,437,123
ALKYLPHENYL BORATES IN EPDM RUBBERS
Filed Oct. 27, 1966
Fig. 1
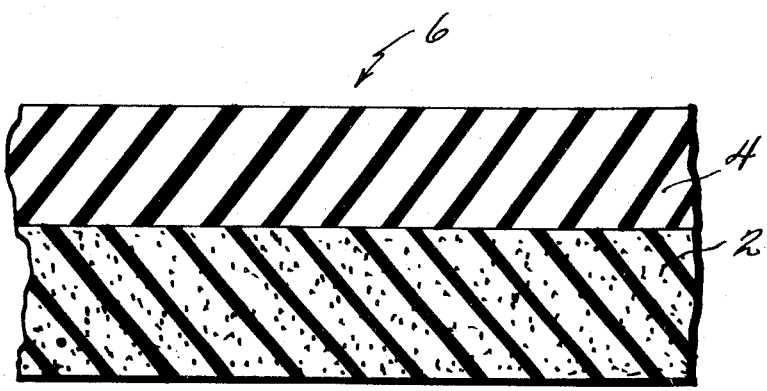
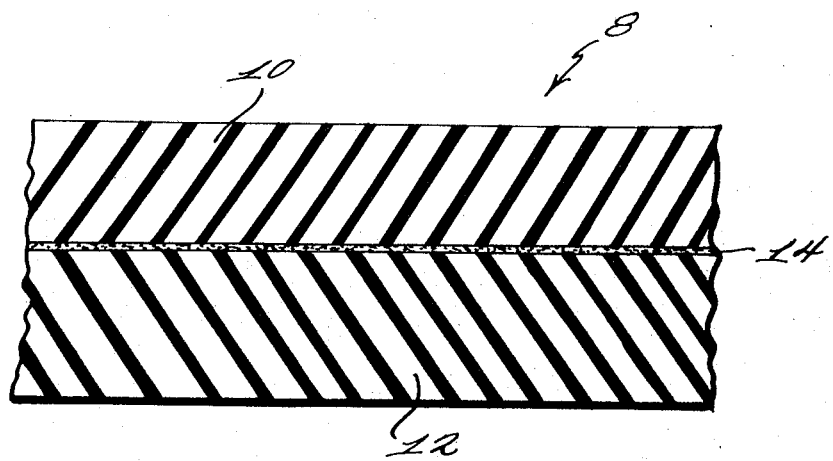
Fig. 2
INVENTORS
MANUEL A. JORDAN
KENNETH C. PETERSEN
BY Cushman, Darby & Cushman
ATTORNEYS 3,437,123
ALKYLPHENYL BORATES IN EPDM RUBBERS
Manuel A. Jordan, Schenectady, and Kenneth C. Petersen, Scotia, N.Y., assignors to Schenectady Chemicals, Inc., Schenectady, N.Y., a corporation of New York
Filed Oct. 27, 1966, Ser. No. 589,886
Int. Cl. C08f 37/16; B32b 27/32
U.S. Cl. 152—330   12 Claims

ABSTRACT OF THE DISCLOSURE

Ethylene-propylene-polyene terepolymer rubber is tackified with a thermoplastic resin which is the reaction product of (1) an aldehyde with a mixture of (2) a phenol and (3) a phenyl borate.

---

The present invention relates to the tackifying of ethylene-propylene-terpolymer (EPDM).

Up to the present time the commercially available tackifiers for EPDM rubber have not proved satisfactory. The tackifiers presently employed for butadiene-styrene rubber and butadiene-acrylonitrile rubber do not tackify EPDM rubber sufficiently to permit tire fabrication.

It is an object of the present invention to prepare novel tackified EPDM rubber compositions.

Another object is to prepare tackified EPDM rubber compositions suitable for tire fabrication.

A further object is to develop a tackified which does not interfere with the final properties of the tire.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by tackifying EPDM rubber with hydrocarbyl phenyl borate-aldehyde compositions. These compositions are prepared by reacting an alkyl phenol with boric acid and then adding the aldehyde. The reaction between the hydrocarbyl phenol (e.g. alkyl phenol) and boric acid normally goes 60 to 85% of completion, usually 69 to 80% of completion as measured by the water collected. There also remains some alkyl phenol and small amounts of boric acid and some dialkyl phenyl borates. The esterification reaction is usually carried out by distilling to 260–300° C., but this temperature range is not critical.

While normally the alkyl phenol is reacted with boric acid to form the alkyl phenyl borate, it is also possible to react the alkyl phenol with a borate of a lower boiling alcohol or phenol to obtain the desired alkyl phenyl borate and alkyl phenol mixture. Thus there can be used a mixture of p-t-butyl phenol and either trimethyl borate or triethyl borate to form the alkyl phenyl borate. In such case methanol or ethanol will be collected as the by-product rather than water.

Also boric oxide can be used in place of boric acid.
The equation for the reaction is:

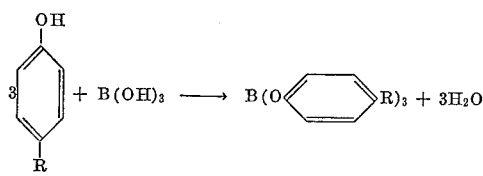

The mixture is then reacted with the aldehyde. Normally there are used 0.5 to 2.5 moles of aldehyde per mole of hydrocarbylphenyl available from the hydrocarbylphenyl borate and the free hydrocarbyl phenol. As little as 0.4 mole of aldehyde can be used per total mole of hydrocarbylphenyl.

To avoid undue cross-linking of the tackifier normally either none or only small amounts of trifunctional phenols should be present among the reactants. Consequently the alkyl and other hydrocarbyl phenols have their hydrocarbyl group in the ortho or para position. As used in the claims the term "a phenyl borate" includes borates of phenol and hydrocarbyl substituted phenols.

There can be used trifunctional phenols if insufficient aldehyde is employed to obtain cross-linking. Thus there can be reacted 1.3 to 2.4 moles of formaldehyde with the triphenyl borate containing reaction product of 3 moles of phenol and 1 mole of boric acid. In essence, the formaldehyde reaction production in such case is a novolak resin. Such novolaks are thermoplastic or permanently fusible in a manner similar to the products from the difunctional alkyl phenols.

As stated, however, the preferred phenols are difunctional phenols, particularly p-alkyl phenols. In the case of the higher alkyl phenols the commercial products normally contain small amounts of dialkyl phenols. Thus commercial dodecyl phenol is p-dodecyl phenol containing as much as 10% di(dodecyl) phenol, as well as small amounts of O-dodecylphenol. The presence of the dialkyl phenol does not interfere with the desired reactions with boric acid and aldehyde. There can be used mixtures of phenols and also mixtures of aldehydes. Preferably the alkyl group of the alkyl phenol has 4 to 8 carbon atoms. The alkyl group can contain up to 20 carbon atoms.

Examples of suitable phenols are p-tert, butyl phenol, p-tert, octyl phenol, p-dodecyl phenol, p-amyl phenol, p-butyl phenol, mixed alkyl phenol having 16 to 20 carbons in the alkyl group (most of the substitution being para), p-butyl phenol, O-butyl phenol, O-octyl phenol, O-tert, octyl phenol, p-sec butyl phenol, p-sec heptyl phenol, p-decyl phenol, p-cresol, p-ethyl phenol, p-propyl phenol, p-isopropyl phenol, thymol, p-hydroxydiphenyl, p-styrylphenol (p-phenethyl phenol), p-phenmethyl phenol, p-nonyl phenol (containing 4% of the ortho isomer and 5% of 2,4-dinonyl phenol), p-tetradecyl phenol, p-octadecyl phenol, p-licosanyl phenol, p-cyclohexyl phenol and p-pentadecyl phenol.

As the aldehyde there can be used formaldehyde (e.g. in the form of trioxane or paraformaldehyde), acetaldehyde, furfural, butyraldehyde, benzaldehyde, isobutyraldehyde, crotonaldehyde, propionaldehyde, valeraldehyde, cinnamaldehyde, salicylaldehyde.

With the difunctional alkylphenol borate products using a mole ratio alkyl phenol to boric acid of 3:1 the amount of paraformaldehyde employed was adjusted to vary the melting point of the resulting resins. The melting point of the resin, however, does not appear to be critical in respect to tackification. Thus in a number of tests and melting point of the resin was varied from 57° C. to 115° C. with good results in the tackifying of EPDM rubber. In fact, viscous liquid resins were also suitable.

The hydrocarbyl phenyl borate-aldehyde products of the present invention are outstanding tackifiers for EPDM rubbers and even give values of 100+ on a tack meter in contrast to a value of approximately 2 for the non-tackified EPDM and the values of approximately 10 for the better EPDM tackifiers in the art. In addition, the tackifiers of the present invention do not substantially interfere with the final properties of the EPDM rubber.

As the EPDM rubber there can be employed many of the commercially available EPDM rubbers. The EPDM rubber normally contains 30 to 70 molar percent (preferably 50 to 60 molar percent) of ethylene, 65 to 20 molar percent (preferably 35 to 45 molar percent propylene) and 1 to 15 molar percent (preferably 3 to 5 molar percent) of the nonconjugated polyolefin. Usually the polyolefin is not over 10 molar percent. The ethylene and propylene can each be 5 to 95 molar percent of the composition.

As used in the present specification and claims the term nonconjugated polyolefin includes aliphatic nonconjugated polyene hydrocarbons and cycloaliphatic nonconjugated polyene hydrocarbons, e.g., endocyclic dienes. Specific examples of suitable nonconjugated polyolefins include pentadiene-1,4; hexadiene-1,4; dicyclopentadiene, methyl cyclopentadiene dimer, cyclododecatriene, cyclooctadiene-1,5; 5-methylene-2-norbornene.

Specific examples of suitable terpolymers are the Royalenes which contain 55 mole percent ethylene, 40 to 42 mole percent propylene and 3 to 5 mole percent dicyclopentadiene; Enjay terpolymers, e.g., ERP–404 of Enjay and Enjay 3509 which contains about 55 mole percent ethylene, 41 mole percent propylene and 4 mole percent 5-methylene-2-norbornene; Nordel, a terpolymer of 55 mole percent ethylene, 40 mole percent propylene and 5 mole percent hexadiene-1,4. Another suitable terpolymer is the one containing 50 mole percent ethylene, 47 mole percent propylene and 3 mole percent 1,5-cyclooctadiene (Dutrel).

Examples of EPDM rubbers are given in United States Patents 2,933,480; 3,000,866; 3,063,973; 3,093,620; 3,093,621, and 3,136,739, in British Patent 880,904 and in Belgian Patent 623,698.

Terpolymers and other EPDM rubbers from ethylene, propylene and dicyclopentadiene are exemplified in Tarney Patent 3,000,866; Adamek Patent 3,136,739 and Dunlop (British) Patent 880,904. EPDM rubbers from ethylene, propylene and 1,4-hexadiene are exemplified in Gresham Patent 2,933,480. As shown in Gresham other suitable non-conjugated diolefins are 1,4-pentadiene; 2-methyl-1,5 hexadiene, 3,3-dimethyl-1, 5-hexadiene, 1,7-octadiene, 1,9-decadiene, 1,19-eicosadiene, 1,4-hexadiene, 1,9-octadecadiene, 6-methyl-1,5-heptadiene, 7-methyl-1,6-octadiene, 11-ethyl-1,11-tridecadiene.

EPDM rubbers from ethylene, propylene and 5-methylene-2-norbornene are exemplified in U.S. Patent 3,093,621. Suitable norbornadiene, e.g., 2-methyl norbornadiene, 2-ethyl norbornadiene, 2-n-heptyl norbornadiene are shown in Gladding Patent 3,063,973 and bicyclo compounds such as bicyclo (2,2,2) heptadiene-2,5 are shown in Dunlop (British) Patent 880,904. The use of cyclooctadiene-1,5 and other cyclodienes is shown in Montecatini (Belgium) Patent 623,698. Thus these can be used in making the EPDM elastomer 1,4-cycloheptadiene, 1,4-cyclooctadiene, 1,6-cyclodecadiene, 1,5-cyclododecadiene, 1,7-cyclodecadiene, 1,5,91cyclododecatriene, 1-methyl-1,5-cyclooctadiene.

The EPDM rubbers are generally sulfur-vulcanizable.

The compositions of the present invention containing the tackifier and the EPDM or EPR rubber can also include conventional rubber additives such as carbon black, zinc oxide, stearic acid, vulcanizing or cross-linking agents, e.g., sulfur and/or peroxides, e.g., dicumyl peroxide, dibenzoyl peroxide, di-t-butyl peroxide, cumene hydroperoxide, methylethyl ketone peroxide, t-butyl perbenzoate, fillers and pigments such as silica, calcium silicate, lignin, clay calcium carbonate, plasticizers or softeners, e.g., paraffinic oils such as Circo light oil, highly aromatic hydrocarbon oils such as Sundex 53, and naphthenic oils such as Circosol 2xH.

There can also be employed conventional accelerators such as mercaptobenzothiazole (MBT), tetramethylthiuram monosulfide (Monex), tetramethylthiuram disulfide (Tuads), zinc diethyl dithiocarbamate (Zimate), benzothiazyl disulfide, tellurium diethyl dithiocarbamate as well as antioxidants, e.g., N,2-dinitroso-N-methylaniline, 4,4'-bis(2-t-butylphenol) sulfide, 2,2'-methylenebis (6-t-butyl-4-methylphenol), N-phenyl-B-naphthylamine N-methyl-N,4-dinitrosoaniline.

While normally the tackifiers of the present invention are employed in an amount of 5 to 30 parts per 100 parts of EPDM rubber, these proportions can be varied widely, e.g., from 3 to 60 parts per 100 parts of the rubber. The tackifier containing compositions can be formulated in either the solid rubber, e.g., by milling or in a solvent solution or dispersion, e.g., using cyclohexane, gasoline, trichloroethylene or tetrachloroethylene as the solvent.

Unless otherwise indicated all proportions are by weight.

Typical formulations within the present invention are as follows:

FORMULATION 1

| | Parts |
|---|---|
| Ethylene propylene terpolymer (EPDM) | 100 |
| Carbon black | 20–250 |
| Plasticizer | 5–75 |
| Tackifier | 5–80 |

These materials can then be compounded in conventional fashion with zinc oxide, stearic acid, accelerators and curing agents to give a satisfactory cured composition. The formulation can be in either the solid rubber state or in a solvent solution.

FORMULATION 2

| | Parts |
|---|---|
| EPDM rubber | 100 |
| Inert filler | 20–250 |
| Plasticizer | 20–150 |
| Tackifier | 5–80 |

These materials can then be compounded in conventional fashion with zinc oxide, stearic acid, accelerators and curing agents to give a satisfactory cured composition. The formulations can be in either the solid rubber state or in a solvent solution.

Example 1(a)

Nine hundred grams (6 moles) of p-tert butyl phenol and 120 grams (2 moles) of boric acid were heated to 300° C. in a 3-liter flask fitted with a Dean and Stark trap to measure and collect water formed in the esterification. In 5½ hours the temperature of 300° C. was reached and 88 ml. of distillate were collected. The temperature was lowered to 130° C. and then 90 grams (2.75 moles) of 91% paraformaldehyde (the other 9% being water) were added. The reaction was vigorous and exothermic with the temperature rising to 160° C. Heat was applied to raise the temperature to 200° C. The resin was cooled to 160° C. and held for 1¼ hours. The resin was then poured into a pan to cool. There were obtained 902 grams of resin having a Ball and Ring Melting Point of 81° C.

Example 1(b)

The procedure of Example 1(a) was repeated. The amount of the 91% paraformaldehyde employed was 90 grams to give a resin having a Ball and Ring M.P. of 85° C.

Example 1(c)

Nine hundred grams of p-t-butylphenol and 120 grams of boric acid were loaded into a 3-liter flask set up for distillation. The reactants were brought to 260° C. at atmospheric pressure. The mixture was cooled to 130° C. and 90 grams of the 91% paraformaldehyde were added. The temperature was brought to 200° C. while distilling the water formed. The temperature was lowered to 160° C. and held for 0.5 hour. The resin was then poured into a pan to cool. There were obtained 993 grams of resin having a Ball and Ring M.P. of 75° C.

Example 2(a)

618 grams (3 moles) of p-tert. octyl phenol and 60 grams (1 mole) of boric acid were heated to 300° C. and the water formed in the esterification collected. In approximately two hours, 300° C. was reached and 42 ml. of water was collected in the Dean and Stark trap. The temperature was lowered to 130° C. and 67.2 grams of the 91% paraformaldehyde was added. Heat was applied to assist the exotherm in bringing the temperature to 200° C. The resin was then cooled to 160° C., held for ½ hour and poured into a pan to cool. There were obtained 633 grams of a resin having a Ball and Ring M.P. of 92° C.

Example 2(b)

The procedure of Example 2(a) was repeated but the amount of the 91% paraformaldehyde employed was 42 grams to give a resin having a Ball and Ring M.P. of 66° C.

Example 3

A mixture of 786 grams (3 moles) of p-dodecyl phenol and 60 grams (1 mole) of boric acid, were heated over a period of two hours to 300° C. and 36 ml. of water formed in the esterification was collected. The temperature was lowered to 130° C. and 90 grams of the 91% paraformaldehyde were added. Heat was applied to assist the exotherm in bringing the temperature to 200° C. The temperature was lowered to 160° C., held there for 30 minutes and the resin poured into a pan to cool. There were obtained 705 grams of resin having a Ball and Ring M.P. of 79° C.

Example 4(a)

A mixture of 5 moles of p-t-butyl phenol, 1 mole of p-cresol and 2 moles of boric acid were heated to 300° C. until about 88 ml. of distillate were collected. The temperature was lowered to 130° C. and 80 grams of the 91% paraformaldehyde were added. Heat was applied to aid the exotherm in bringing the temperature to 200° C. The temperature was lowered to 160° C., held for 0.5 hour, and the resin poured into a pan to cool. The resin had a Ball and Ring M.P. of 87° C.

Example 4(b)

The procedure of Example 4(a) was repeated but the esterification reaction was carried only to 260° C. so that less p-cresol was lost in the distillate to give a resin having a Ball and Ring M.P. of 66° C.

Example 5

A mixture of 5 moles of p-t-butyl phenol, 1 mole of p-ethyl phenol and 2 moles of boric acid were heated to 300° C. until about 90 ml. of water and 89 ml. of alkyl phenol, primarily ethyl phenol, as distillate were collected. The temperature was lowered to 130° C. and 82 grams of the 91% paraformaldehyde were added. Heat was applied to assist the exotherm in bringing the temperature to 200° C., the temperature was lowered to 160° C., held there for 30 minutes and the resin poured into a pan to cool. The resin had a Ball and Ring M.P. of 89° C.

Example 6(a)

A mixture of 58 pounds of p-t-butyl phenol, 12.7 pounds of p-t-amyl phenol, 3.5 pounds of xylene (solvent) and 9200 grams of boric acid were placed in a 15-gallon reactor equipped for azeotropic reflux. The temperature was brought to reflux removing water of esterification and returning xylene back to the batch. When 6.3 pounds of water were removed, the xylene was stripped to 470° F.

The temperature was then lowered to 220° F. and 3320 grams of the 91% paraformaldehyde were added. The temperature rose due to the exothermic reaction. When the exotherm ceased, the temperature was brought to 400° F. The temperature was then lowered to 320° F., using a vacuum to aid in the cooling and removing residual xylene. The batch was held for 5 minutes at 320° F., using 26 inches (Hg) of vacuum. The resin was then dumped into a pan to cool. There were obtained 69.75 pounds of resin having a Ball and Ring M.P. of 89° C.

Example 6(b)

The procedure of Example 6(a) was repeated but the vacuum was employed only until the resin had a Ball and Ring M.P. of 82° C.

Example 7

A mixture of 5 moles of p-t-butyl phenol, 1 mole of p-t-octyl phenol and 2 moles of boric acid were heated to 300° C. until about 93 ml. of water distillate were collected. The temperature was lowered to 130° C. and 100 grams of the 91% paraformaldehyde were added. Heat was applied to aid the exotherm in bringing the temperature to 200° C., the temperature was lowered to 160° C., held there for 0.5 hour and the resin poured into a pan to cool. The resin had a Ball and Ring M.P. of 91° C.

Example 8

The procedure of Example 7 was repeated but the alkyl phenols employed were 750 grams (5 moles) of p-t-butyl phenol and 262 grams (1 mole) of p-dodecyl phenol. 120 grams of boric acid were employed. There were employed 130 grams of the 91% paraformaldehyde. The resin formed had a Ball and Ring M.P. of 115° C.

Example 9

The procedure of Example 7 was repeated but the alkyl phenols employed were 5 moles of p-t-butyl phenol and 1 mole of a mixed p-alkyl phenol having 16 to 20 carbons in the alkly chain. There were employed 150 grams of the 91% paraformaldehyde. The resin formed had a Ball and Ring M.P. of 109° C.

Example 10

450 grams (3 moles) of p-t-butyl phenol, 60 grams (1 mole) of boric acid and 23 grams of toluene were added to a 3-liter flask. The water (46 ml.) liberated was collected in a Barrett Trap. The temperature was lowered to 104° C. and 144 grams (2 moles) of isobutyraldehyde was added drop-wise over 0.5 hour maintaining reflux. The batch was held at reflux for 3 hours. The batch was then brought to 195°C. and cooled to 160° C. and poured into a can as a liquid viscous resin, yield 574 grams, viscosity (Gardner-Holt) at 25° C. was Z.

Example 11

The procedure of Example 10 was repeated using 140 grams (1.8 moles) of 90% crotonaldehyde (the 10% balance was inert material) in place of the isobutyraldehyde.

The resin was obtained in an amount of 566 grams, Ball and Ring M.P. 38° C.

Example 12

Into a 5-liter flask were weighed 618 grams (3 moles) of p-t-octylphenol, 60 grams (1 mole) of boric acid and 23 grams of toluene. The temperature was brought to 280° C. removing water azeotropically until 45 ml. of water were removed. The batch was cooled to 105°C. and 175 grams (2.25 moles) of the 90% crotonaldehyde were added drop-wise over 0.5 hour. When all of the crotonaldehyde was added, the batch was refluxed for 3 hours, then distilled to 160° C. and held there for 40 minutes. The resin was cooled to 107° C. and 40 grams (1.21 moles) of the 91% paraformaldehyde were added. The resin was refluxed atmospherically for 2 hours. The batch was then distilled at full vacuum to 160° C., Ball and Ring M.P. 78° C.

Example 13(a)

In a 5-liter flask set up for azeotropic distillation there were placed 786 grams (3 moles) of p-dodecyl phenol, 60 grams (1 mole) of boric acid and 27 ml. of toluene. The temperature was brought to 280° C. while removing 37 ml. of water out of a theoretical amount of 54 ml. The temperature was brought to 110° C. and 360 grams (5 moles) of isobutyraldehyde were added drop-wise over 10 minutes. The mixture was refluxed for three hours and then distilled to 160° C. The resin was cooled to 110° C. and 40 grams (1.21 moles) of the 91% paraformaldehyde were added. The temperature was brought to reflux and held there for two hours. The resin was then distilled under full vacuum to 160° C. A sample of the resin thus prepared was removed and found to have a viscosity (Gardner-Holt) at 25° C. of Z 10+.

Example 13(b)

The remaining resin in the flask from Example 13(a) was cooled to 110° C. and 30 grams (0.91 mole) of the 91% paraformaldehyde were added and reacted at 137–152° C. for one hour. The resin was distilled under 29 inches (Hg) of vacuum to 180° C. The resin had a Ball and Ring M.P. of 65° C.

Example 14

Into a 5-liter flask set up for azeotropic distillation there were placed 2620 grams (10 moles) of p-dodecyl and 200 grams (3.33 moles) of boric acid. The temperature was brought to 280° C. while distilling off 125 ml. of water out of a theoretical total of 180 ml. The product was cooled to 110° C. and then 5 grams of 98% sulfuric acid were added. Over a period of 15 minutes 1080 grams (10.2 moles) of benzaldehyde were added drop-wise. The temperature was brought to reflux and maintained there for 3 hours. The resin was then subjected to distillation at atmospheric to 160° C. to remove volatiles and then full vacuum was applied for 5 minutes. The resin remaining in the flask was poured into a pan to cool to obtain 3500 grams of product having a Ball and Ring M.P. of 85° C.

Example 15

Into a 2-liter flask set up for azeotropic distillation there were placed 591 grams (3 moles) of styryl phenol and 60 grams (1 mole) of boric acid. The mixture was brought to 283° C. while removing 38 ml. of water out of a theoretical total of 54 ml. The temperature was lowered to 100° C. and 60 grams (1.8 moles) of the 91% paraformaldehyde were added. The resin exothermed and the temperature was brought to 200° C. while distilling atmospherically. The resin remaining in the flask was then cooled to 160° C. and 29 inches (Hg) of vacuum were applied for 15 minutes. The resin was then poured into a pan to cool to obtain 620 grams of product having a Ball and Ring M.P. of 70° C.

Example 16

Into a 3-liter flask set up for azeotropic distillation were placed 940 grams (10 moles) of phenol, 200 grams (3.33 moles) of boric acid and 50 ml. of xylene. The mixture was brought to 191° C. while removing 145 ml. of water out of a 180 ml. theoretical total. The product was then cooled to 100° C. and 195 grams (5.95 moles) of the 91% paraformaldehyde were added. The temperature exothermed and the batch was then distilled to 200° C. The temperature was then lowered to 160° C. and held for 4 hours. The resin was then poured into a pan to cool to obtain 1020 grams of product having a Ball and Ring M.P. of 75° C.

All of the resins set forth in the above examples are suitable as tackifiers for EPDM rubbers. The tackifier resins were tested in the following formulations:

FORMULATION A

| | Parts |
|---|---|
| Royalene 304 | 100 |
| HAF Black (carbon black) | 80 |
| Aromatic oil (Sundex 53) | 40 |
| Zinc oxide | 5 |
| Stearic acid | 1 |
| 2-mercaptobenzothiazole | 2 |
| Tetramethylthiuram monosulfide | 1 |
| Sulfur | 3.5 |
| Tackifier resin | 12 |

The Royalene 304 is an EPDM rubber available from U.S. Rubber Company and is a terpolymer of about 55 mole percent ethylene, 40–20 mole percent propylene and 3 to 5 mole percent dicyclopentadiene.

The aromatic oil is used for processing and is a high boiling, non-volatile aromatic hydrocarbon oil having a viscosity between 36 and 46 poise at 250° C., see Yurcick Patent 3,255,274, col. 5, lines 28–30.

FORMULATION B

| | Parts |
|---|---|
| Nordel 1040 | 100 |
| HAF Black (carbon black) | 50 |
| Aromatic oil | 15 |
| Zinc oxide | 5 |
| Stearic acid | 1 |
| Sulfur | 2 |
| 2-mercaptobenzothiazole | 0.5 |
| Tetramethylthiuram monosulfide | 1.5 |
| Tackifier resin | 12.0 |

Nordel 1040 is an EPDM rubber available from Du Pont and is a terpolymer of 55 mole percent ethylene, 40 mole percent propylene and 5 mole percent hexadiene 1,4.

The aromatic oil is the same one employed in Formulation A.

Many of the alkyl phenyl borate-aldehyde resins of the present invention gave outstanding results on the tack meter, frequently giving values of 100+ as compared to a value of 2 for the same EPDM rubber composition when tested on the tack meter using a contact pressure of 1000 grams and 200 grams of separation force. Under similar conditions the better EPDM tackifiers of the past gave values of approximately 10. The compounds of the present invention also have very little effect on the properties of the rubber. EPDM rubbers tackified with the resins of the invention have sufficient tack to build tires.

The results on the tack meter are given in the following tables. In the tables the figures cited are in seconds needed to pull plies apart using the indicated formulations.

TABLE 1.—FORMULATION B
[Contact pressure 1,000 grams and 200 grams separation]

| Example | Immediate | 1 day | 2 days | 3 days |
|---|---|---|---|---|
| 1(b) | 100+ | | | |
| 1(c) | 70.3 | 57.5 | 79.8 | 100+ |
| 1(a) | 100+ | 100+ | 100+ | 100+ |
| 1(a) | 100+ | 100+ | 100+ | 100+ |

TABLE 2.—FORMULATION A
[Contact pressure 1,000 grams and 200 grams separation]

| Example | Immediate | 1 day | 2 days | 3 days |
|---|---|---|---|---|
| 2(b) | 13.3 | 24.2 | 24.8 | 12.6 |
| 1(b) | 100+ | 100+ | 100+ | 100+ |
| 1(c) | 21.4 | 65.2 | 100+ | 100+ |
| 4(a) | 13.3 | 17.7 | 42 | 100+ |
| 1(a) | 25.0 | 100+ | 100+ | 100+ |
| 6(b) | 23.3 | 100+ | 100+ | 100+ |
| 6(a) | 100+ | 100+ | 100+ | 100+ |

TABLE 3.—FORMULATION B
[Contact pressure 500 grams, 500 grams separation]

| Example | Immediate | 1 day | 2 days | 3 days |
|---|---|---|---|---|
| 1(c) | 1.9 | 1.2 | 0.3 | |
| 4(a) | 1.8 | 0.7 | 0.3 | |
| 1(a) | 3.4 | 0.9 | 0.7 | |
| 6(b) | 1.8 | 0.7 | 0.3 | |
| 6(a) | 6.3 | 2.1 | 2.0 | |
| 4(b) | 1.4 | 0.7 | 0.4 | |
| 8 | 1.3 | 0.9 | 0.8 | |
| 15 | 0.7 | 1.0 | 0.8 | 0.4 |
| 14 | 6.3 | 7.5 | 0.2 | 6.5 |

The product of Example 14 gave a particularly good tackifier.

The ethylene-propylene-polyene terpolymer rubbers containing the borate resin tackifying agent of the present invention are particularly effective as bonding cements for stocks of ethylene-propylene-polyene rubbers, (EPDM rubbers) and before, during and after vulcanization as indicated effect an excellent bonding of such stocks to form a composite structure exhibiting great resistance to separation. The resulting vulcanized composite can be embodied in numerous useful articles of manufacture adapted to be made from such EPDM rubbers. Thus the article can be a fabric-reinforced pneumatic tire (either entirely new or retreaded), a conveyor belt, an article of footwear, e.g., a heel, or other rubber article adapted to be manufactured by vulcanizing juxtaposed stocks of sulfur-vulcanizable EPDM rubbers. Layers of such terpolymer (EPDM) stocks tackified according to the invention can be bonded together by vulcanization in the conventional manner to yield a composite structure exhibiting outstanding adhesion at the interface.

The EPDM terpolymer rubber stocks to be joined are compounded in the conventional manner known in the art.

The novel tackifying and bonding cement comprises (A) an unvulcanized sulfur-vulcanizable ethylene-propylene-polyene terpolymer rubber of the type described above, (B) compounding and vulcanizing ingredients of the type described above, and (C) the hydrocarbyl phenyl (or phenyl) borate-aldehyde resins disclosed supra.

In preparing the cement there is normally first formed a terpolymer rubber stock embodying the terpolymer and compounding and vulcanizing ingredients therefor. The compounding and vulcanizing ingredients are so chosen and are used in such amounts as to effect vulcanization of the terpolymer to a vulcanizate having good properties; the selection of these ingredients and determination of amounts are well known by those skilled in the art. Typical materials have been set forth supra.

The novel cement is usually formulated to contain 5 to 20 parts of total solids per 100 parts of the cement. The volatile organic solvent used as the vehicle in the cement can be any liquid having the requisite power of dissolving the terpolymer rubber and the resin and having appropriate volatility. Examples of solvents are cyclohexane, gasoline, trichloroethylene and tetrachloroethylene.

In practicing this phase of the invention a thin layer of the cement is applied to one or both surfaces of terpolymer rubber stock to be joined, a considerable portion of the solvent allowed to evaporate from the coated surface or surfaces and the two surfaces brought together with suitable pressure and the assembly vulcanized in conventional fashion.

The invention can be used not only to join two unvulcanized EPDM stocks but one fo the stocks being joined can already be vulcanized. Thus, the invention can be used for the retreading of EPDM rubber tires with tread rubber (so-called camelback) made from EPDM rubber. The tire to be retreaded is prepared for retreading in the usual way by grinding off the old tread. The cement is applied to the vulcanized surface or to the unvulcanized surface or to both surfaces prior to bringing them together and vulcanizing the bonding layer and unvulcanized stock. Excellent tackification and cured adhesion of the tread to the tire are thus achieved.

The invention can also be used to join portions of a single body of stock. For example, an endless item, e.g. a gasket, can be made from such a terpolymer stock by interposing the cement between the ends of a section of such stock, bringing the ends together, and vulcanizing.

In a specific example, 10 parts of Formulation B modified to include 40 parts of tackifier resin instead of 12 parts using the resin of Example 6a, in 100 parts of cyclohexane was painted on two unvulcanized EPDM stocks having the same composition as Formulation B except for the omission of the tackifying resin. The stocks were dried for two hours and then cured adhesion pads were made with cement coated surfaces in direct contact.

In another example, two stocks of Formulation B were simply joined directly together by pressure and cured in conventional fashion at 325° F. for 1 hour to form a two ply rubber tire.

This form of the invention will be understood best in connection with the drawings wherein:

FIGURE 1 of the drawing is a fragmentary sectional view of a portion of a two ply tire; and FIGURE 2 is a view similar to FIGURE 1 but employing a splice cement between two plies.

Referring more specifically to FIGURE 2 there is provided a tire indicated generically at 8 composed of two plies 10 and 12 of Nordel 1040 rubber without a tackifier resin. Between the two plies 10 and 12 there is provided a tackifier cement 14.

We claim:

1. Ethylene-propylene-polyene terpolymer rubber admixed with 3 to 60 parts per 100 parts of terpolymer of a thermoplastic resin which is the reaction product of (1) an aldehyde with a mixture of (2) a phenol and (3) a phenyl borate, the mixture of (2) and (3) being the same as that obtained by reacting a phenol and boric acid to from 60 to 85% of completion, there being employed 0.4 to 2.5 moles of aldehyde per mole of total phenyl groups present in the phenyl borate and free phenol.

2. A mixture according to claim 1 wherein the aldehyde is formaldehyde.

3. A mixture according to claim 2 wherein the phenol includes a trifunctional phenol and insufficient formaldehyde is employed to render the resin thermosetting.

4. A mixture according to claim 2 wherein the phenol is a difunctional hydrocarbyl phenol.

5. A mixture according to claim 4 wherein the phenol is an alkyl phenol having 4 to 20 carbon atoms in the alkyl group.

6. A mixture according to claim 5 wherein the alkyl phenol is a para alkyl phenol.

7. A mixture according to claim 6 wherein the mixture of 2 and 3 is that obtained by reacting 3 moles of the p-alkyl phenol with 1 mole of boric acid and the reaction is carried 69 to 85% of completion and there are employed 0.4 to 2.5 moles of aldehyde per mole of total alkyl phenyl group present in the alkyl phenyl borate and free alkyl phenol.

8. An article of manufacture comprising two sulfur vulcanizable ethylene-propylene-polyene terpolymer rubber bodies bonded together by vulcanization while in juxtaposition, at least one of said bodies being the mixture of claim 7.

9. An article of manufacture comprising two sulfur vulcanizable ethylene-propylene-polyene terpolymer rubber bodies bonded together by vulcanization while in juxtaposition, at least one of said bodies being the mixture of claim 1.

10. An article of manufacture according to claim 9 wherein the rubber bodies are plies which are joined together to form a rubber tire and the phenol is an alkyl phenol.

11. A mixture according to claim 1 wherein the aldehyde is benzaldehyde and the phenol is an alkyl phenol.

12. A mixture according to claim 2 wherein the thermoplastic resin has a melting point of 57° C. to 115° C.

References Cited

UNITED STATES PATENTS 2,623,866 12/1952 Twiss et al. _____ 260—67
2,855,382 10/1958 Mitchell.
2,979,484 4/1961 Redfarn _____ 260—57
3,367,996 2/1968 Strauss et al. _____ 260—848

SAMUEL H. BLECH, *Primary Examiner.*

JOHN C. BLEUTGE, *Assistant Examiner.*

U.S. Cl. X.R.

161—248; 253, 258, 260—17.5; 19, 23.5, 33.6, 38, 41, 53, 55, 57, 67, 848, 897